(12) United States Patent
Gollamudi et al.

(10) Patent No.: US 7,801,071 B2
(45) Date of Patent: Sep. 21, 2010

(54) SYSTEM AND METHOD FOR PROVIDING MULTI-BEAM SCHEDULING

(75) Inventors: Sridhar Gollamudi, Morris Plains, NJ (US); Harish Viswanathan, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1522 days.

(21) Appl. No.: 10/697,449

(22) Filed: Oct. 30, 2003

(65) Prior Publication Data

US 2005/0094602 A1 May 5, 2005

(51) Int. Cl.
*H04B 7/212* (2006.01)
(52) U.S. Cl. ........................ 370/323; 370/325; 370/329; 370/342; 455/277.1; 455/509; 455/560; 455/562.1; 375/130; 375/140; 375/347; 375/355; 375/E1.001
(58) Field of Classification Search ................. 370/323, 370/325, 329, 339, 342, 209, 335, 337, 318, 370/320, 347, 312, 343; 455/277.1, 277.2, 455/560, 561, 562.1, 509, 447, 450, 101, 455/272, 518, 520, 442; 725/72; 375/130, 375/140, 347, 355, E1.001
See application file for complete search history.

(56) References Cited

U.S. PATENT DOCUMENTS

| | | | | |
|---|---|---|---|---|
| 5,319,796 | A * | 6/1994 | Grube et al. ................ | 455/509 |
| 6,744,743 | B2 * | 6/2004 | Walton et al. ................ | 370/318 |
| 2002/0039900 | A1 * | 4/2002 | Wiedeman et al. ........... | 455/428 |
| 2004/0235527 | A1 * | 11/2004 | Reudink et al. .............. | 455/561 |
| 2006/0271704 | A1 * | 11/2006 | Chan et al. ................... | 709/240 |
| 2008/0080472 | A1 * | 4/2008 | Bertrand et al. .............. | 370/344 |

FOREIGN PATENT DOCUMENTS

GB          2378857          2/2003

OTHER PUBLICATIONS

Benjamin NG et al., Performance Enhancement of DS-CDMA System for Wireless Local Loop, Department of Electrical Computer Engineering, pp. 78-82.

* cited by examiner

*Primary Examiner*—Nghi H Ly
*Assistant Examiner*—Inder P Mehra
(74) *Attorney, Agent, or Firm*—Fletcher Yoder PC

(57) ABSTRACT

Embodiments of the present invention relate to communication systems. Such communication systems may include a beamformer that is adapted to provide a plurality of beams, each of the plurality of beams providing communication for a corresponding coverage envelope, the plurality of coverage envelopes comprising at least one pair of overlapping coverage envelopes and at least one pair of non-overlapping coverage envelopes, and a scheduler that assigns system resources from a group of shared system resources to a plurality of receivers distributed throughout the coverage envelopes, the scheduler being adapted to assign the same system resources from the group of shared system resources for use during a simultaneous data transmission to a receiver in each of the coverage envelopes that comprises the at least one pair of non-overlapping coverage envelopes.

21 Claims, 3 Drawing Sheets

| AVAILABLE CHANNELIZATION CODES | BEAM |
|---|---|
| CHANNELIZATION CODE 202 | BEAM 110, 112, 114 |
| CHANNELIZATION CODE 204 | BEAM 110 |
| CHANNELIZATION CODE 206 | BEAM 114 |
| CHANNELIZATION CODE 208 | BEAM 110, 112, 114 |
| CHANNELIZATION CODE 210 | BEAM – |

200

SYSTEM AND METHOD FOR PROVIDING MULTI-BEAM SCHEDULING

BACKGROUND OF THE INVENTION

1. Field of the Invention

The present invention relates generally to communication systems that transmit, receive and process communication signals and, more particularly, to a system and method for providing multi-beam scheduling in a communication system.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Communication systems that transmit and receive communication signals continue to grow in importance. Such systems are used to provide television, radio, satellite communication, cell phone service, wireless computing networks and the like. An important aspect of such systems is the ability to efficiently process signals to continue to improve the quality of service provided to users.

Channelization Codes in Code Division Multiple Access (CDMA) Systems

Cellular telephone systems may employ a variety of communication schemes to transmit data from a base station to a pool of mobile users within the transmission range of the base station at any given time. The area within the transmission range of a base station may be referred to as a "cell." One of the schemes employed to transmit data efficiently in a cell is known as code division multiple access (CDMA).

In a CDMA cell, one or a few users are chosen (scheduled) at each time instant in which data are transmitted. The choice of users for scheduling may be based on several factors such as the instantaneous channel strength of the users, the amount of data that the users have waiting in their buffers and the like. The scheduled users share the system resources available in that time slot for transmission of their respective signals. The potentially scarce shared system resources that are required for transmission of users' signals, and affect their quality of service metrics within the system include transmission power, channelization codes and the like.

In general, channelization codes are codes that may be used to create signals that may be distinguished from each other so that signals intended for reception by a particular user are not confused with signals intended for reception by other users. In other words, a channelization code may be employed to impart a uniquely identifiable pattern to each signal being transmitted by a base station. Channelization codes may be employed to impart particular transmission characteristics to signals as well. For example, different channelization codes may be employed to impart orthogonality to signals transmitted simultaneously within the same cell to prevent those signals from interfering with each other. Orthogonal signals are signals that do not interfere with the information contained in each other upon propagation through a channel that does not distort the signals. The use of channelization codes to provide orthogonal signals within the same cell is an example of conservation of system resources because the use of orthogonal signals allows greater amounts of data to be transmitted per unit of time.

The use of channelization codes to allow the simultaneous transmission of non-interfering data is called code multiplexing. Generally speaking, a signal that is being transmitted to any user in a cell at the same time must have its own set of channelization codes to prevent interference with other simultaneously transmitted signals. Thus, the number of channelization codes available at any particular time may be a limitation on the amount of data that may be transmitted within a system at any given time.

Beamforming and Fixed Beam Networks

Antennas and beamformers are important components that assist in the effective transmission and reception of transmitted communication signals. An antenna assembly typically transmits communication signals and receives transmitted communication signals from the air. Many antennas have arrays that are comprised of multiple elements to assist in the transmission and reception of communication signals.

Antenna arrays may be used to perform beamforming to enhance reception of signals from different angles of arrival, and transmit beamforming to enhance the quality of transmission of signals to different users. Phase offsets between signals received from a user on different elements of the antenna array depend on the angle of arrival of the user's signals at the antenna array. This phenomenon can be utilized to combine signals arriving from a desired direction constructively at the base station receiver using a receive beamformer. A receive beamformer is a device that receives inputs from the various elements of an antenna array and combines them into output signals or beams based on certain criteria.

In addition, transmit beamformers may be used to enhance signals prior to their transmission by an antenna array. Transmit beamformers may apply weighting coefficients to the signal intended for any user before transmission by an antenna array such that the desired signal strength for the user is enhanced and/or that the interference caused by this user's signal to other users is reduced. The weighting coefficients applied by a transmit beamformer may be adjusted according to various measurements of the signals received from the desired user at the antenna array or any other knowledge of the user's angle of location from the antenna array. Using transmit beamforming weight coefficients, the signal intended for a desired user may be thought of as being "steered" toward the direction of the desired user, such that the signals strength for the desired user is maximized and interference caused by this signal to users located at other angles is reduced.

Beamformers may be employed to create configurations known as fixed beam networks. In a fixed beam network or system, a beamformer may be adapted to provide a plurality of beams by maximizing signal strengths towards a plurality of fixed or predefined directions. A set of beamformer weight coefficients are stored for each fixed beam serving a specific portion of the cell. When users are within the proximity of one of the fixed beams, their signal reception from the base station is strong. The beamforming weight coefficients that are applied for any user in the system are chosen to be the coefficients corresponding to the strongest fixed beam for that user. Fixed beam networks are generally a compromise between complexity and performance, since they are generally easier to implement than dynamically computing beamforming weight coefficients individually for each user in the system.

Sectorization is a strategy for attempting to improve the use of system resources in a fixed beam network. As an example, we may compare a hypothetical three-cell deployment scenario where the coverage area of a base station is split into three cells, each covering a 120 degree angular region, to a six-cell deployment scenario with size cells, each covering a 60 degree region. Each cell in either deployment scenario may employ its own set of channelization codes that may be used to schedule users that are within its coverage. A base station in a six-cell system therefore may use twice the total number of channelization codes of a base station in a three-cell system. Sectorization, however, may be difficult to implement without significantly changing antenna configurations.

SUMMARY OF THE INVENTION

Embodiments of the present invention relate to communication systems. Such communication systems may include a beamformer that is adapted to provide a plurality of beams, each of the plurality of beams providing communication for a corresponding coverage envelope, the plurality of coverage envelopes comprising at least one pair of overlapping coverage envelopes and at least one pair of non-overlapping coverage envelopes, and a scheduler that assigns system resources from a group of shared system resources to a plurality of receivers distributed throughout the coverage envelopes, the scheduler being adapted to assign the same system resources from the group of shared system resources for use during a simultaneous data transmission to a receiver in each of the coverage envelopes that comprises the at least one pair of non-overlapping coverage envelopes.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention may improve quality of service metrics such as throughput in communication systems by improving the reusability of relatively scarce system resources. In particular, embodiments of the present invention may improve throughput in a fixed beam network by providing a system and method in which user signals employ beam multiplexing as well as code multiplexing so that signal transmissions in non-overlapping beams reuse channelization codes.

Figure 1:
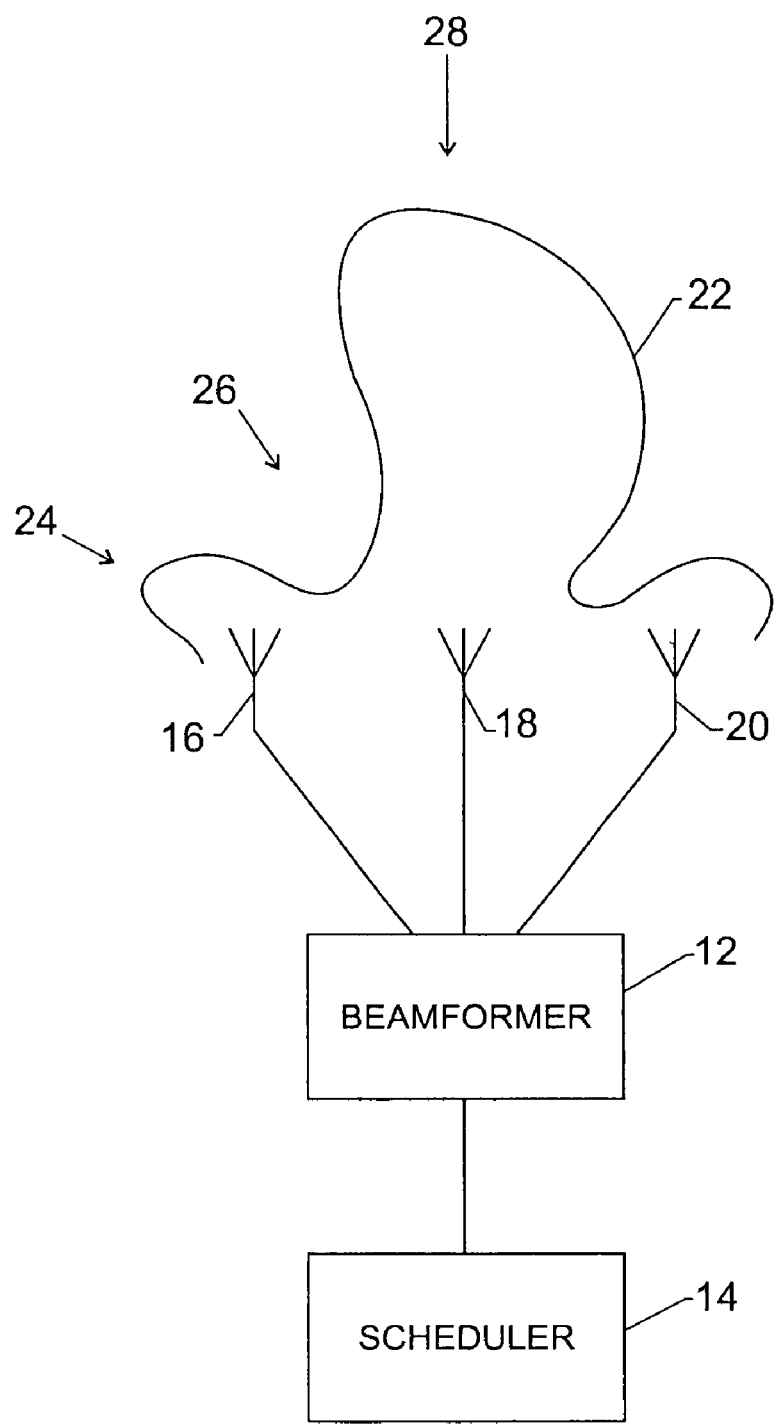
FIG. 1 is a block diagram illustrating a communication system in accordance with embodiments of the present invention.

Referring to the drawings, FIG. 1 is a block diagram illustrating a communication system in accordance with embodiments of the present invention. The communication system, which may comprise a cellular base station, is generally referred to by the reference numeral 10. A beamformer 12 is connected to receive and transmit signals from a plurality of antenna elements 16, 18 and 20. The antenna elements 16, 18 and 20 present an antenna pattern 22. The antenna pattern 22 is illustrative of the directions from which the antenna is likely to have the best reception of transmitted communication signals.

The antenna pattern 22 may comprise lobes, such as the lobes 24 and 28. Additionally, the antenna pattern may comprise troughs such as the trough 26. The beamformer 12 may employ dynamically controllable weighting coefficients to mathematically give greater weight to signals received from the predefined directions when producing its output signal.

The beamformer 12 may be connected to a scheduler 14, which may comprise scheduler hardware and/or software that performs the function of scheduling the output of transmitted data with respect to the pool of users within the transmission range of the antenna elements 16, 18 and 20 at any given time. As set forth above, the beamformer may be adapted to provide a fixed beam communication network by employing weighting coefficients for transmitted and received signal components indicative of a plurality of predefined directions. An example of such a fixed beam network is discussed below with respect to FIG. 2.

Figures 2, 3:
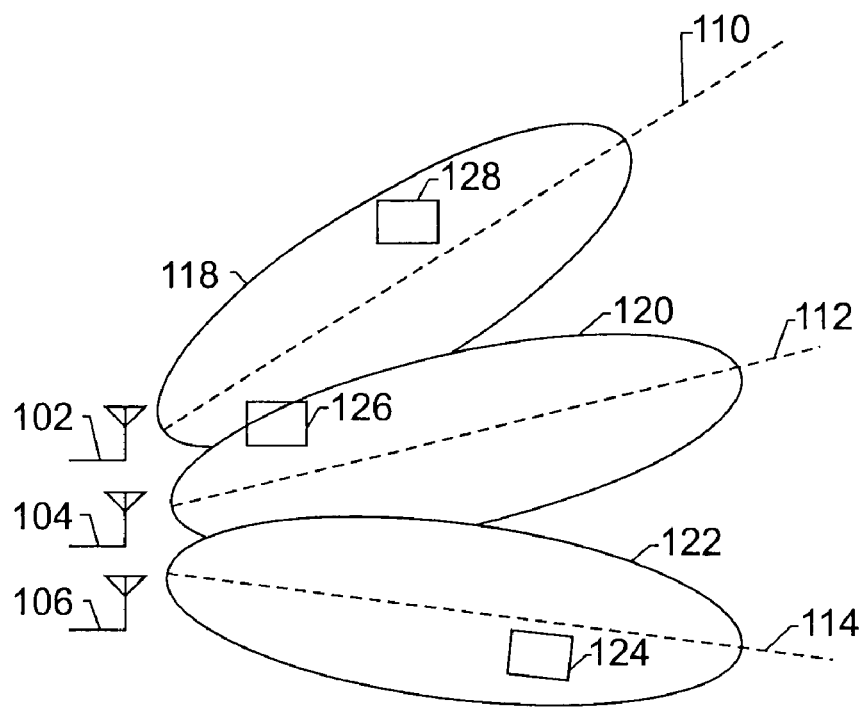
FIG. 2 is a block diagram showing the deployment of fixed beams in a fixed beam network in accordance with embodiments of the present invention.
FIG. 3 a block diagram showing an exemplary list of available channelization codes for each of a plurality of beams in accordance with embodiments of the present invention.

FIG. 2 is a block diagram showing the deployment of fixed beams in a fixed beam network in accordance with embodiments of the present invention. The fixed beam network is generally referred to by the reference numeral 100. As illustrated in FIG. 2, embodiments of the present invention relate to improving system throughput by employing the reuse of channelization codes for beam scheduling.

In FIG. 2, the fixed beam network 100 is established by a three-element antenna array that comprises antenna elements 102, 104 and 106. The antenna array may comprise a portion of a cell tower or the like. A beamformer such as the beamformer 12 (FIG. 1) is adapted to provide three fixed beams 110, 112 and 114. Each of the fixed beams 110, 112 and 114 provide a coverage envelope where reception is the strongest. In FIG. 2, the fixed beams 110, 112 and 114 respectively provide coverage envelopes 118, 120 and 122.

The fixed beam system 100 may include scheduler circuitry or software such as the scheduler 14 (FIG. 1). The scheduler may assign or schedule the delivery of data to individual users within a cell at a given time. The scheduler 14 may also assign channelization codes to data transmissions and assign a particular beam to a particular user when the user is in the proximity of one of the coverage envelopes 118, 120 or 122. In addition, other functions may be performed by the scheduler 14. When a user is between one of the fixed beams, the user's reception would be degraded compared to when the user is within one of the coverage envelopes 118, 120 or 122.

As set forth above, a base station may have limited system resources that must be used in an efficient manner to service the users within a cell at any particular time. The radio resources at the disposal of the scheduler at the base station in any time slot may include the available transmit power, $P_{avail}$, the available number of channelization codes, $W_{avail}$ and the like. In general, the beams 110, 112 and 114 may comprise a set of M beams. The beams partition a cell into M distinct spatial portions, such as the coverage envelopes 118, 120 and 124.

The coverage envelopes provided by some of the M beams may have significant overlaps with the coverage areas provided by other beams. In a given network, each pair of fixed beams may be deemed either overlapping or non-overlapping, depending on the amount of energy that one beam transmits in the coverage portion of the other beam. In the example shown in FIG. 2, the coverage envelope 118 provided by the beam 110 overlaps with the coverage envelope 120 provided by the beam 112. Similarly, the coverage envelope 120 provided by the beam 112 overlaps with the coverage envelope 122 provided by the beam 114. The coverage envelope 118, however, does not have significant overlap with the coverage envelope 122. Accordingly, embodiments of the present invention may be employed to provide beam multiplexing with respect to the coverage envelopes 118 and 122. Specifically, the same channelization codes may be used for users who are within non-overlapping coverage envelopes with an improvement in system throughput and no noticeable degradation in other quality of service metrics.

By way of example, a mobile receiver 128, which may comprise a cellular telephone, may be within the coverage envelope 118 and a mobile receiver 126, which may comprise a cellular telephone, may be in the overlap area between the coverage envelopes 118 and 120. In that case, the same channelization code could not be used for signals being transmitted to the mobile receivers 126 and 128 because those signals would potentially interfere with each other. On the other hand, the channelization code used for the signal transmitted to the mobile receiver 128 could be the same as the channelization code used to transmit a signal to a mobile receiver 124, which may be a cellular telephone, located in the coverage envelope 122 because the coverage envelope 118 does not overlap with the coverage envelope 122.

FIG. 3 a block diagram showing an exemplary list of available channelization codes for each of a plurality of beams in accordance with embodiments of the present invention. The channelization code list, which is generally referred to by the reference numeral 200, may be stored for use by a communication system such as the communication system 10 (FIG. 1). A scheduler such as the scheduler 14 (FIG. 1) may employ the information stored in the channelization code list 200 in scheduling transmissions to users.

The channelization code list 200 may comprise a list of channelization codes that are available for use at a given time. Available channelization codes are identified by the reference numerals 202, 204, 206, 208 and 210 in FIG. 3. Each of the channelization codes 202-210 may be associated with one or more of a plurality of beams that are provided by the communication system to which the channelization code list 200 corresponds.

Each of the available channelization codes contained in the channelization code list 200 may be associated with a coverage envelope provided by one or more of the beams generated in a fixed beam network. In particular, a specific channelization code may be available for simultaneous use in the coverage envelopes created by more than one beam if that channelization code is not being simultaneously used in conjunction with a beam that provides an overlapping coverage envelope.

The exemplary channelization code list shown in FIG. 3 relates to the exemplary fixed beam network 100 shown in FIG. 2. The channelization code list 200 may be continuously updated by the scheduler as transmissions to different users take place. In the example shown in FIG. 3, the channelization code 202 is not presently being used because it is shown as being available for use for a transmission in association with any of the beams 110, 112 or 114 (FIG. 2). The channelization code 204 is available for use in association with the beam 110 (FIG. 2), which may indicate that the channelization code 204 is being simultaneously used in association with the beam 114, which provides a non-overlapping coverage envelope. Similarly, the channelization code 206 is available for use in association with the beam 114 (FIG. 2), which may indicate that the channelization code 206 is being simultaneously used in association with the beam 110 (FIG. 2), which provides a non-overlapping coverage envelope. Thus, the same channelization code may be used simultaneously in both the coverage envelopes 118 and 122.

The channelization code 208 is illustrated as being available for use with any of the beams 110, 112 or 114, which indicates that the channelization code 208 is not being used in association with any beam at the time depicted in FIG. 3. The channelization code 210 is illustrated as not being available for use in association with any beam. This may indicate that the channelization code 210 is being used for a transmission in association with the beam 112, which provides overlapping coverage with the coverage envelopes provided by both the beams 110 and 114. Alternatively, the channelization code 210 may be unavailable because it is being used simultaneously with respect to transmissions in association with both the beam 110 and the beam 114.

Those of ordinary skill in the art will appreciate that the information shown in the channelization code list 200 is given for illustrative purposes only. Embodiments of the present invention may be used in connection with channelization code lists that comprise additional information or information that is organized according to different formats, including multiple lists and the like.

Embodiments of the present invention may employ a wide range of criteria for scheduling transmissions to users in an efficient manner. Examples of criteria that may be used may include the following:

1. the sum total of the transmit powers used for all the scheduled users does not exceed $P_{avail}$;
2. each scheduled user is allocated a subset of the $W_{avail}$ available channelization codes;
3. no two users served by the same beam or overlapping beams share a common channelization code;
4. different users served by the same or overlapping beams may be scheduled using non-overlapping sets of channelization codes; and
5. different users served by non-overlapping beams may be scheduled using overlapping sets of channelization codes.

Users may be scheduled such that no two scheduled users overlap both in channelization codes and beams. Thus, embodiments of the present invention may employ channelization code multiplexing in overlapping beams and channelization code reuse between non-overlapping beams.

Figure 4:
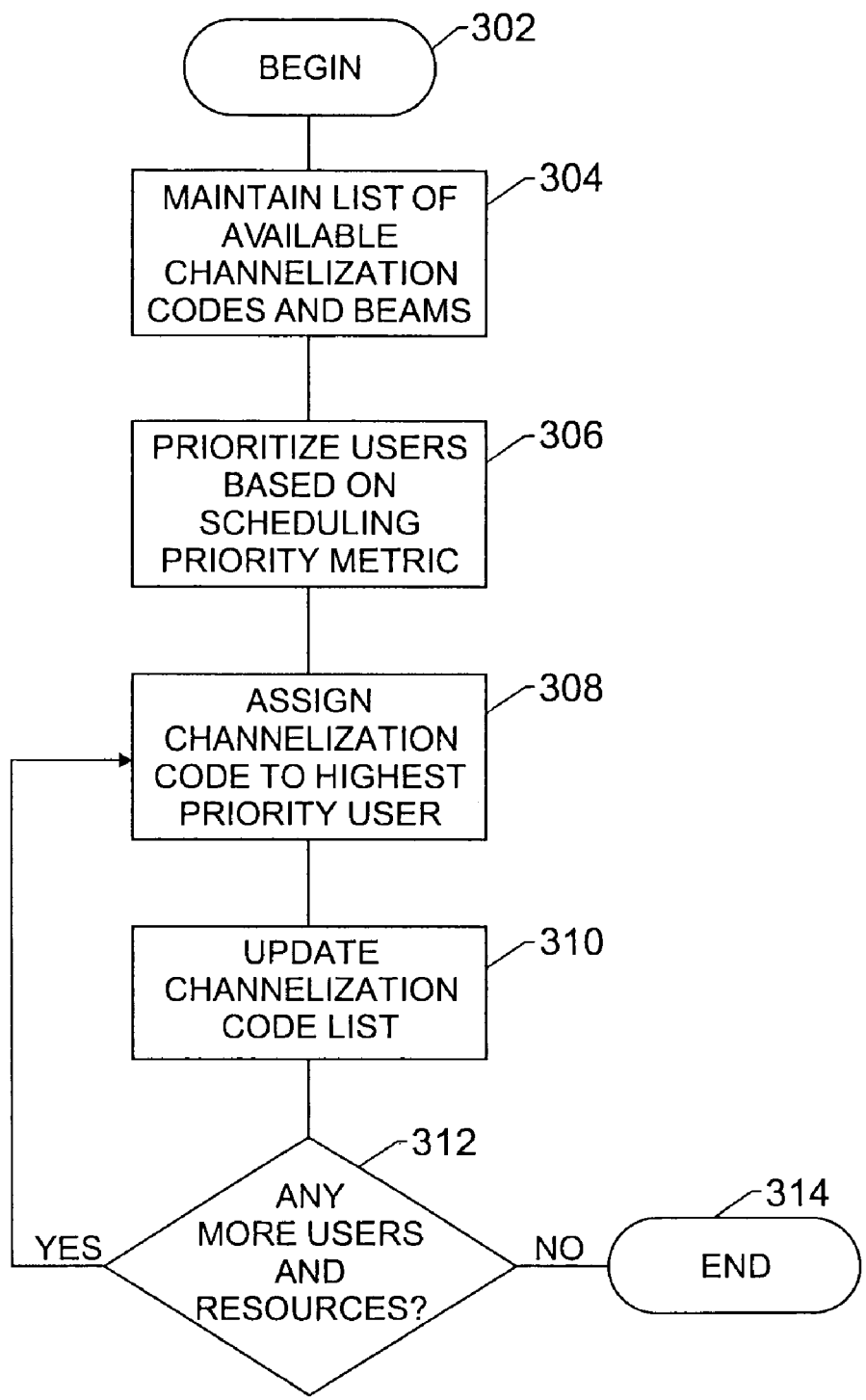
FIG. 4 is a process flow diagram illustrating a process in accordance with embodiments of the present invention.

FIG. 4 is a process flow diagram illustrating a process in accordance with embodiments of the present invention. The process is generally referred to by the reference numeral 300. At block 302, the process begins. As set forth in block 304, a scheduler in a communication system maintains a list of available system resources. The list may include an indicator of the available power for a given transmission, an enumeration of the channelization codes that are available for each beam in a fixed beam system or the like. In a generalized system having M beams, the list of available resources may include all available channelization codes ($W_{avail}$) for all available M beams at the beginning of the scheduling procedure.

At block 306, users are ranked in a prioritized list using a scheduling priority metric. The scheduling priority metric may consider estimates of the instantaneous channel strength of all the users, their buffer occupancies, achieved quality of service relative to desired quality of service for different users, or other fairness criteria.

At block 308, system resources are assigned to users based on the prioritization that took place at block 306. For example, if channelization codes are available for the beam that is providing service to a user, that user may be assigned one or more available channelization codes for an upcoming transmission. As set forth above with respect to FIG. 3, channelization codes may be reused so long as the coverage envelopes provided by the respective beams do not overlap. The channelization code list may be updated to reflect the assignment of channelization codes to the user, as set forth at block 310. The channelization code or codes assigned to the user may be shown as not available for the beams that provide overlapping coverage envelopes, but the code or codes assigned to the user may still be listed as available for use with beams that provide non-overlapping coverage envelopes.

If there are additional users to be serviced and remaining system resources (block 312) the acts associated with blocks 308 and 310 may be repeated. When there are no additional users to be serviced or system resources are exhausted, the process ends (block 314).

Embodiments of the present invention may provide improved system performance with respect to base stations that employ sectorization. Additionally, embodiments of the present invention may provide deployment flexibility in operational networks.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A communication system, comprising:
   a beamformer that is adapted to provide a plurality of beams, each of the plurality of beams providing communication for a corresponding coverage envelope, the plurality of coverage envelopes comprising at least one pair of overlapping coverage envelopes and at least one pair of non-overlapping coverage envelopes; and
   a scheduler that assigns system resources from a group of shared system resources to a plurality of receivers distributed throughout the coverage envelopes, the scheduler being adapted to schedule the allocation of the group of shared system resources such that no two users served by a pair of overlapping coverage envelopes are assigned the same system resources from the group of shared system resources for use during a simultaneous data transmission to a receiver in each of the coverage envelopes that comprises the at least one pair of non-overlapping coverage envelopes, wherein the group of shared system resources comprises a group of channelization codes.

2. The communication system set forth in claim 1, wherein the communication system comprises a fixed beam network.

3. The communication system set forth in claim 1, wherein the scheduler maintains a list of the group of shared system resources and updates the list as shared system resources are assigned to the plurality of receivers.

4. The communication system set forth in claim 1, comprising at least one antenna for transmitting communication signals to and receiving communication signals from the plurality of receivers.

5. The communication system set forth in claim 1, wherein the communication system comprises a cellular telephone base station.

6. The communication system set forth in claim 1, wherein the communication system comprises a code division multiple access (CDMA) cellular telephone base station.

7. The communication system set forth in claim 1, wherein the scheduler prioritizes the plurality of receivers based on at least one scheduling priority metric prior to assigning resources from the group of shared system resources.

8. A method of scheduling data transmissions in a communication system that has a group of shared system resources, the communication system being adapted to provide communication with a plurality of receivers, the method comprising the acts of:
   providing a plurality of beams that each provide communication to a corresponding coverage envelope, the plurality of coverage envelopes comprising at least one pair of overlapping coverage envelopes and at least one pair of non-overlapping coverage envelopes, the plurality of receivers being distributed throughout the plurality coverage envelopes; and
   scheduling the allocation of the group of shared system resources such that no two receivers served by a pair of overlapping coverage envelopes receive the same system resources for use during a simultaneous data transmission to a receiver in each of the coverage envelopes that comprises the at least one pair of overlapping coverage envelopes, wherein the group of shared system resources comprises a group of channelization codes.

9. The method set forth in claim 8, comprising the act of defining the plurality of beams to be fixed beams.

10. The method set forth in claim 8, comprising the act of defining a group of channelization codes to comprise the group of shared system resources.

11. The method set forth in claim 8, comprising the act of maintaining a list of the group of shared system resources.

12. The method set forth in claim 11, comprising the act of updating the list as shared system resources are assigned to the plurality of receivers.

13. The method set forth in claim 8, comprising the act of transmitting data to at least a subset of the plurality of receivers according to a code division multiple access (CDMA) communication protocol.

14. The method set forth in claim 8, comprising the act of prioritizing the plurality of receivers based on at least one scheduling priority metric prior to assigning resources from the group of shared system resources.

15. A communication system, comprising:
   means for providing a plurality of beams, each of the plurality of beams providing communication for a corresponding coverage envelope, the plurality of coverage envelopes comprising at least one pair of overlapping coverage envelopes and at least one pair of non-overlapping coverage envelopes; and
   means for assigning system resources from a group of shared system resources to a plurality of receivers distributed throughout the coverage envelopes, the means for assigning system resources being adapted to schedule the allocation of the group of shared system resources such that no two users served by a pair of overlapping coverage envelopes are assigned the same system resources from the group of shared system resources for use during a simultaneous data transmission to a receiver in each of the coverage envelopes that comprises the at least one pair of non-overlapping coverage envelopes, wherein the group of shared system resources comprises a group of channelization codes.

16. The communication system set forth in claim 15, wherein the communication system comprises a fixed beam network.

17. The communication system set forth in claim 15, wherein the means for assigning system resources maintains a list of the group of shared system resources and updates the list as shared system resources are assigned to the plurality of receivers.

18. The communication system set forth in claim 15, comprising at least one antenna for transmitting communication signals to and receiving communication signals from the plurality of receivers.

19. The communication system set forth in claim 15, wherein the communication system comprises a cellular telephone base station.

20. The communication system set forth in claim 15, wherein the communication system comprises a code division multiple access (CDMA) cellular telephone base station.

21. The communication system set forth in claim 15, wherein the means for assigning system resources prioritizes the plurality of receivers based on at least one scheduling priority metric prior to assigning resources from the group of shared system resources.

\* \* \* \* \*